United States Patent [19]

Bakermans et al.

[11] Patent Number: 4,489,871
[45] Date of Patent: Dec. 25, 1984

[54] STRIP FEEDING APPARATUS

[75] Inventors: Johannes C. W. Bakermans, Harrisburg, Pa.; Dimitry G. Grabbe, Lisbon Falls, Me.

[73] Assignee: AMP Incorporated, Harrisburg, Pa.

[21] Appl. No.: 444,291

[22] Filed: Nov. 24, 1982

[51] Int. Cl.³ .......................... G03B 1/18; B65H 17/24
[52] U.S. Cl. ........................................ 226/52; 226/168
[58] Field of Search ...................... 226/1, 6, 52, 53, 76, 226/86; 355/29; 72/405, 419; 242/47.11; 83/340, 671, 672, 917, 516; 198/413, 475, 625, 679

[56] References Cited

U.S. PATENT DOCUMENTS

| | | | |
|---|---|---|---|
| 198,416 | 12/1877 | Sanford . | |
| 1,733,812 | 10/1929 | MacRae . | |
| 3,788,640 | 1/1974 | Stemmle | 271/64 |
| 3,807,215 | 4/1974 | Olsen et al. | 72/405 |
| 3,842,961 | 10/1974 | Burson et al. | 198/16 R |
| 3,942,788 | 3/1976 | Boyle | 226/168 |
| 3,948,128 | 4/1976 | Russell | 83/110 |
| 3,982,457 | 9/1976 | Berry | 83/517 |
| 4,079,633 | 3/1978 | Cheema et al. | 74/229 |
| 4,115,000 | 9/1978 | Mischo et al. | 355/29 |

FOREIGN PATENT DOCUMENTS 1164185  2/1964  Fed. Rep. of Germany .

OTHER PUBLICATIONS

Daniels, "Process in Search of a Product: Forms Metal at 4,500 SPM", *Metalworking Economics,* Nov. 1969, pp. 125–127.

*Primary Examiner*—Leonard D. Christian
*Attorney, Agent, or Firm*—F. W. Raring; Donald M. Boles

[57] ABSTRACT

Strip feeding apparatus comprises a feed screw having a feeding thread on its surface. The thread is received in notches in one edge of the strip so that rotation of the screw advances the strip. Guides are provided for guiding the strip along the feed path and maintaining the strip in engagement with the thread. The thread may have a portion of each turn which causes no feeding during each revolution so that strip is fed intermittently. The feeding apparatus may be used under a wide variety of circumstances and is disclosed in conjunction with a stamping and forming or similar machine.

22 Claims, 18 Drawing Figures

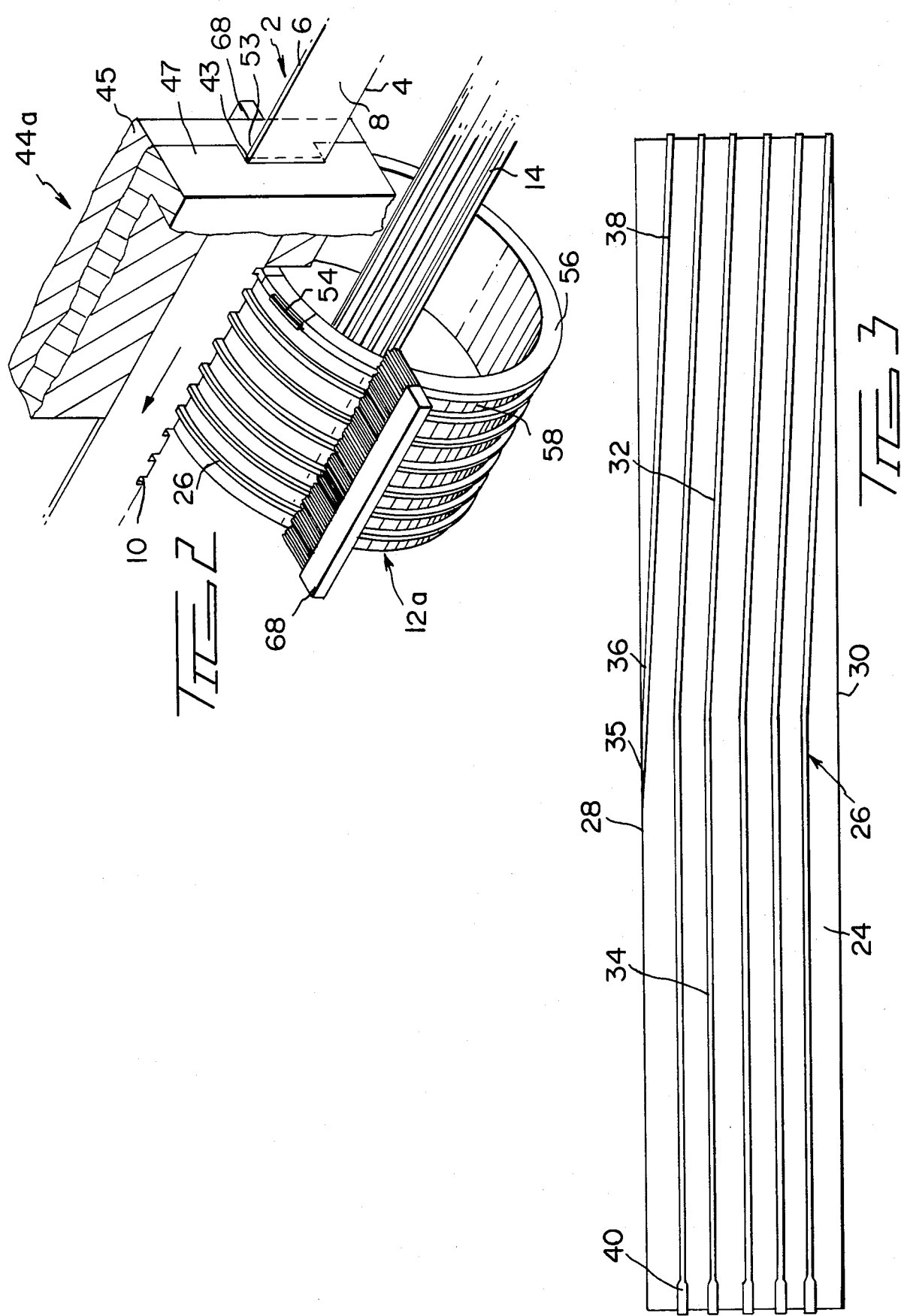

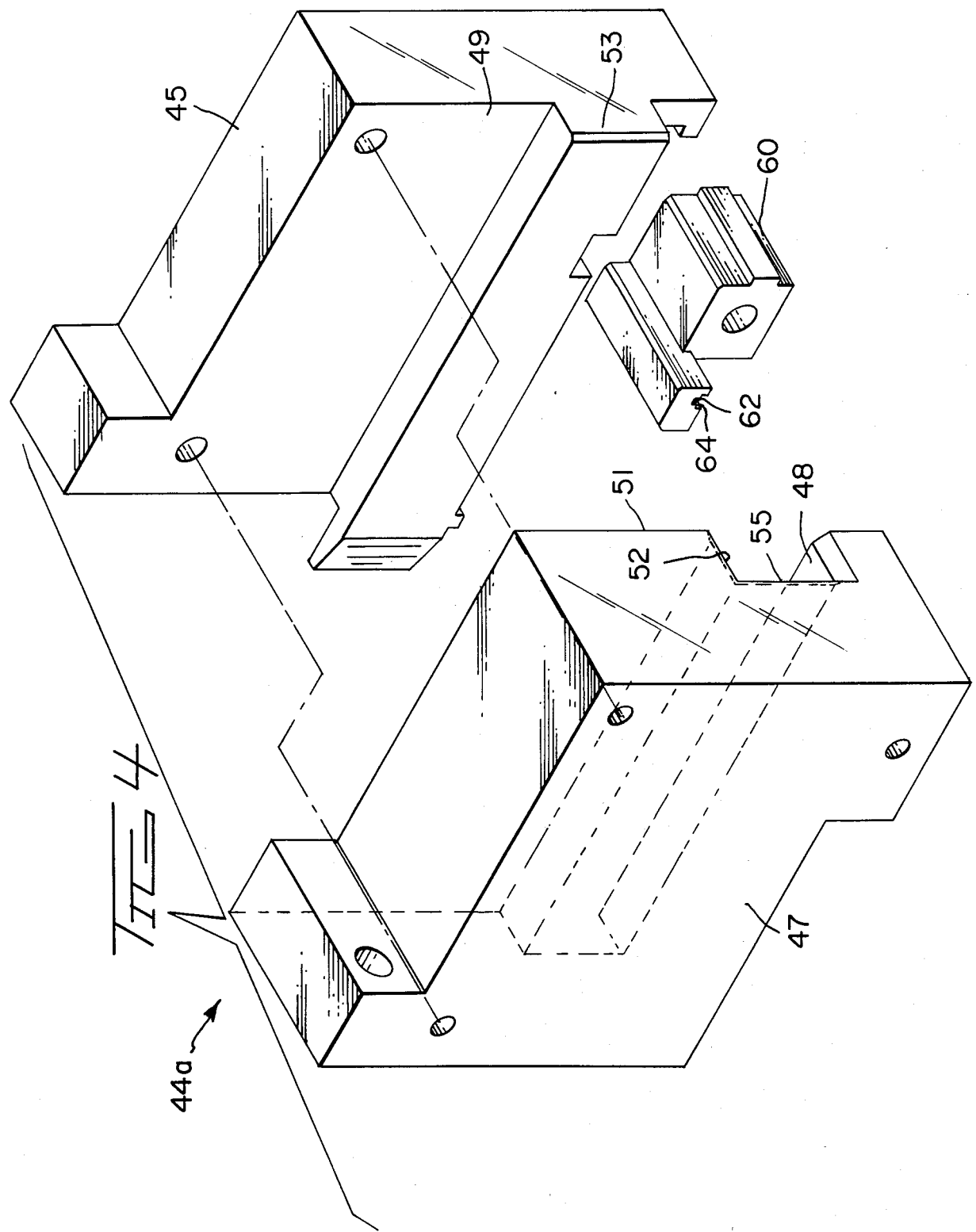

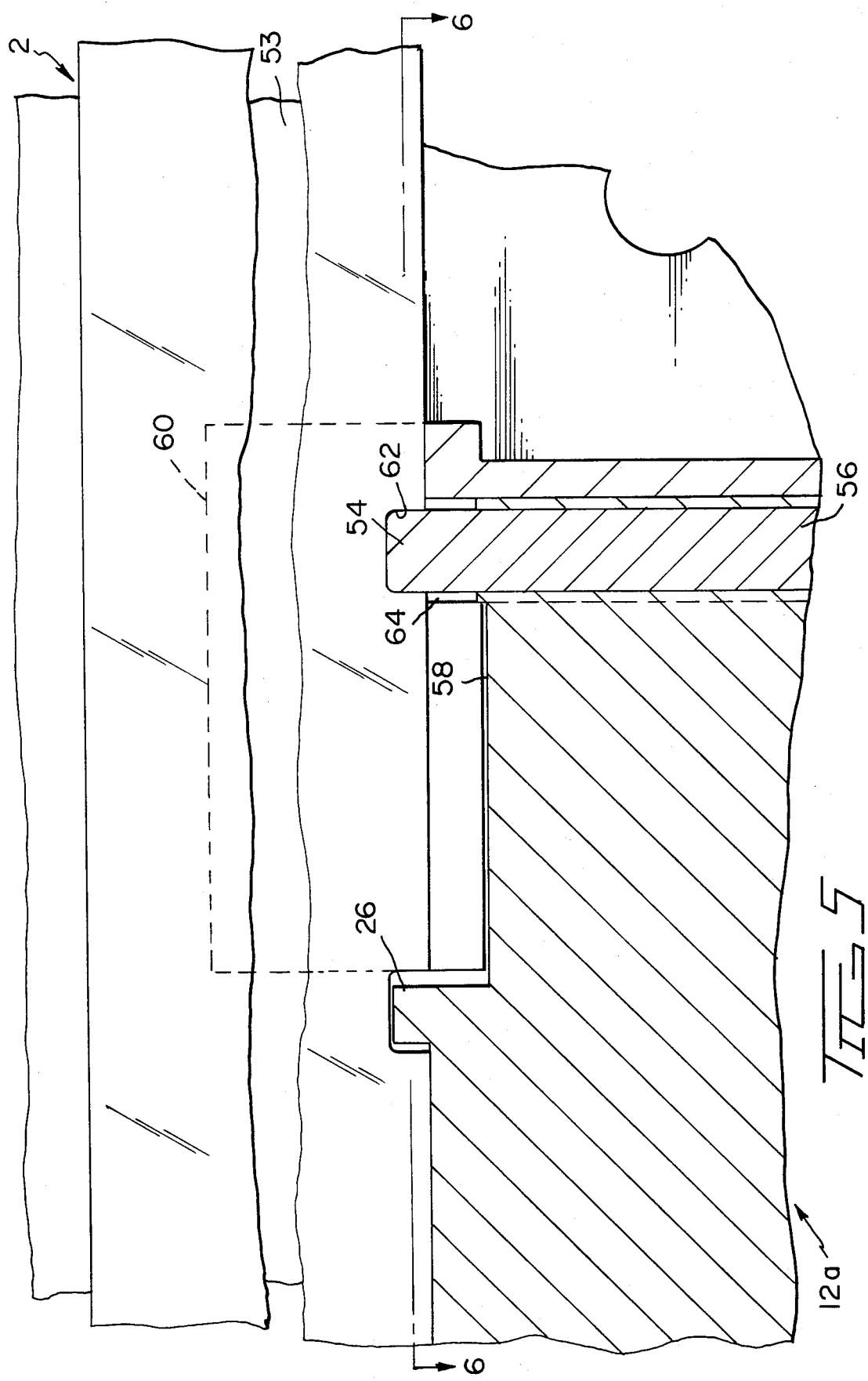

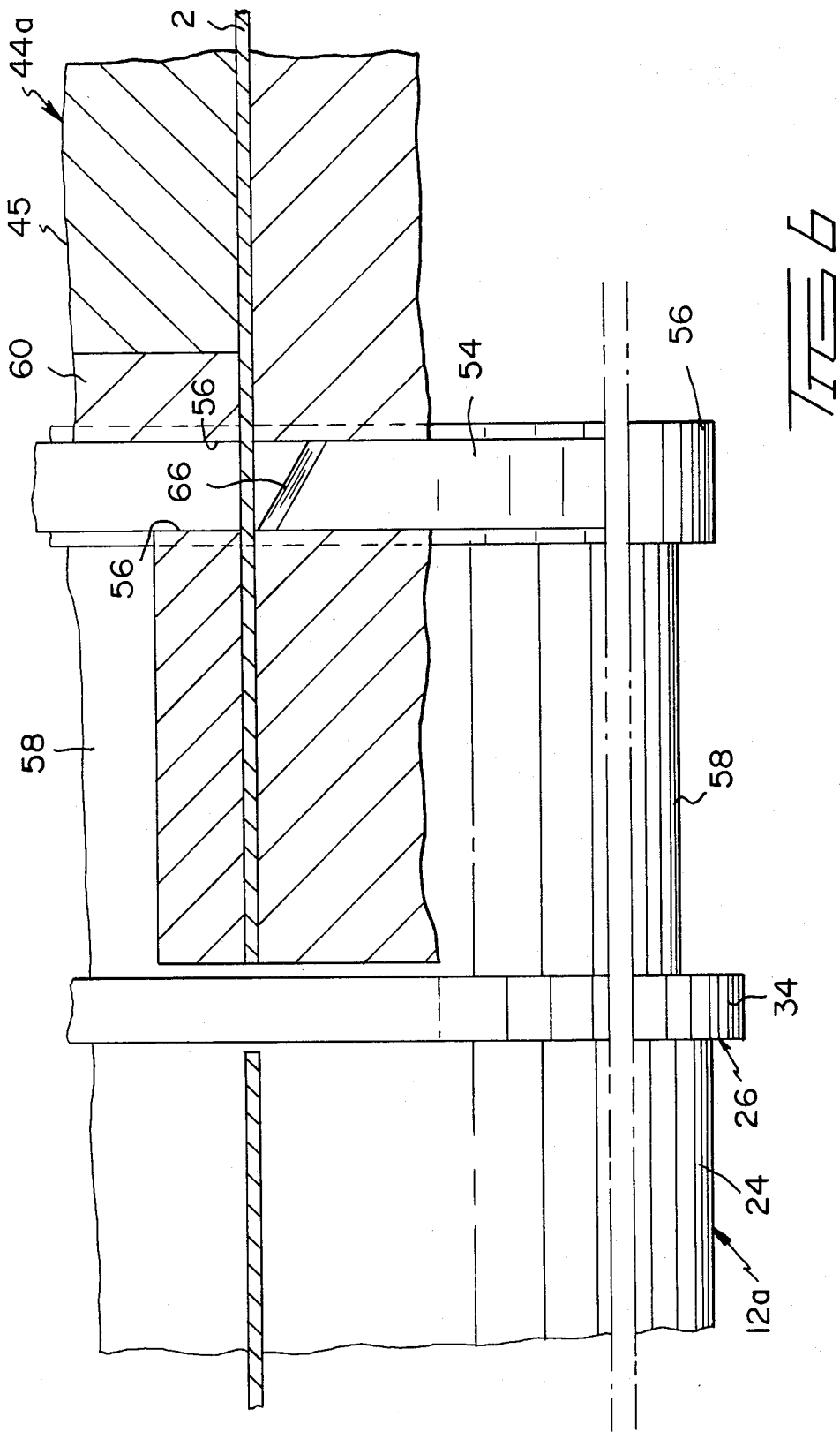

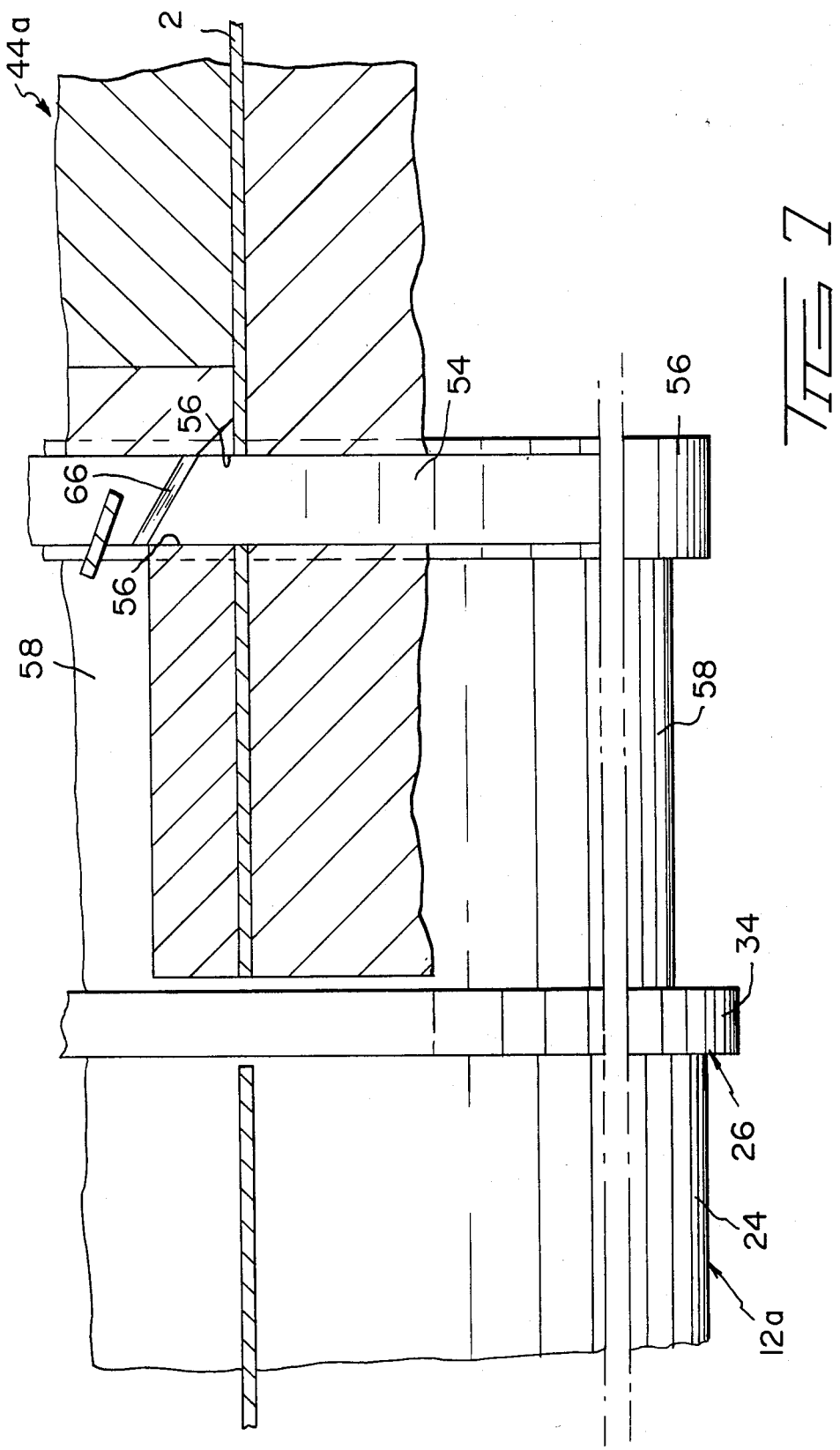

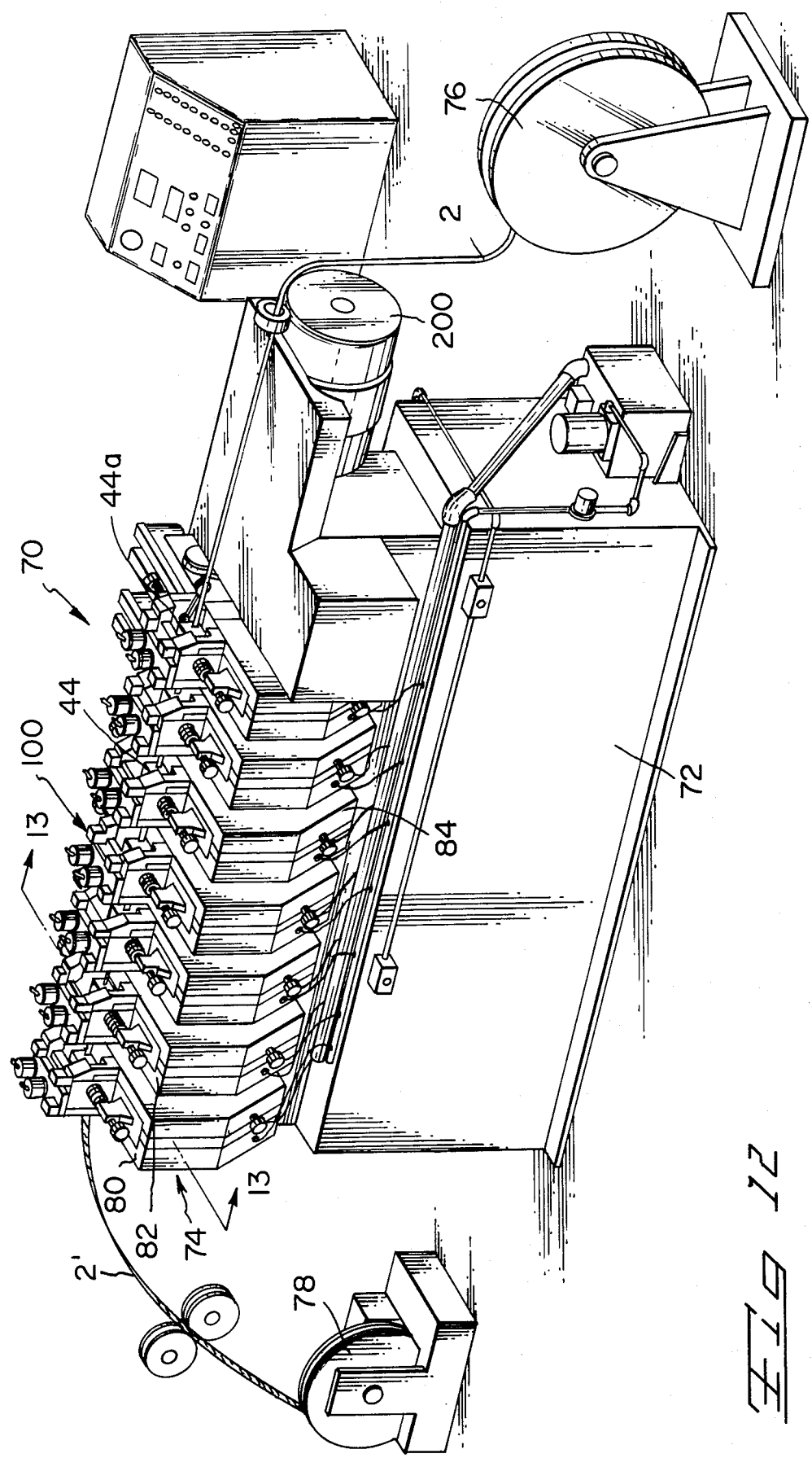

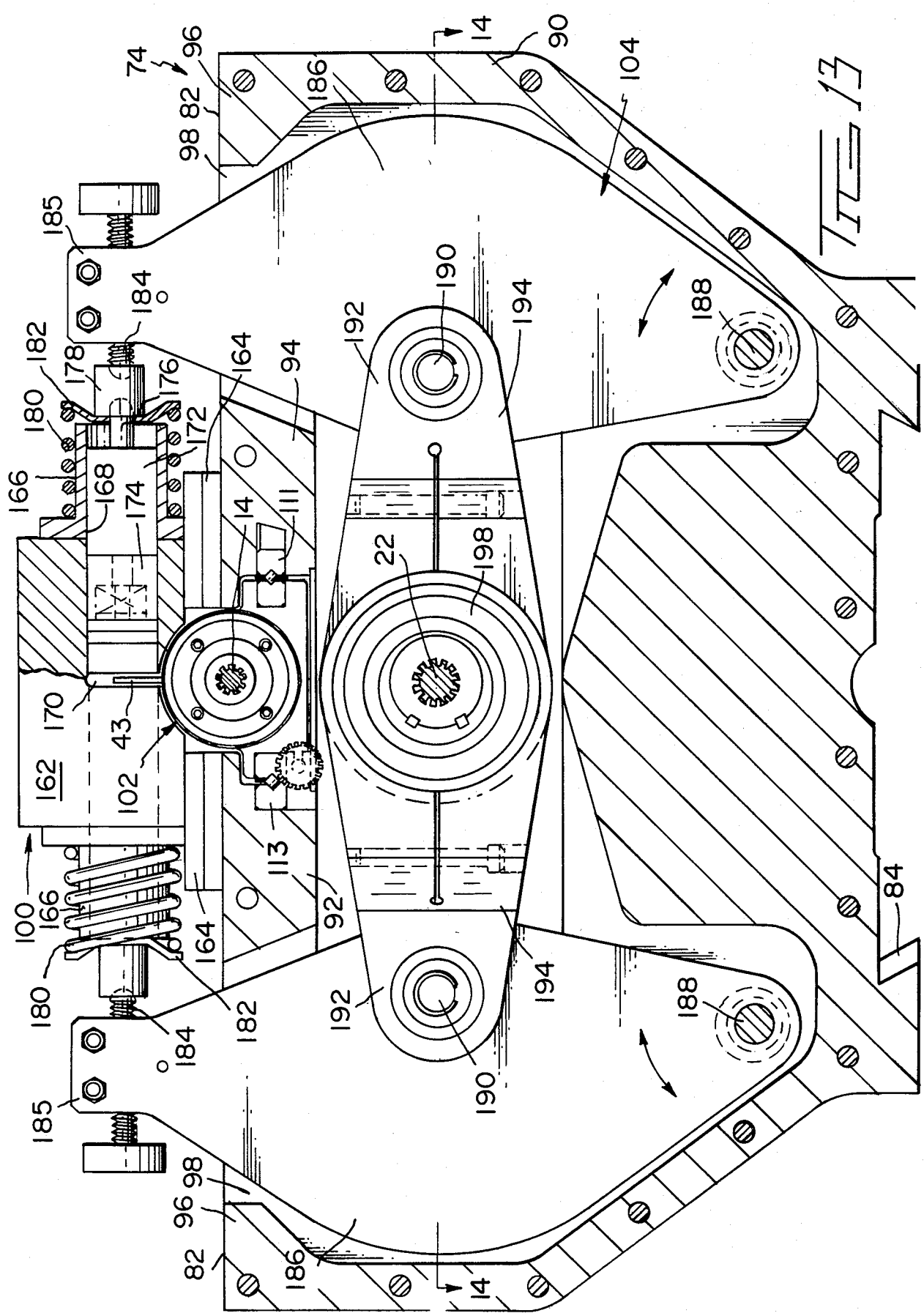

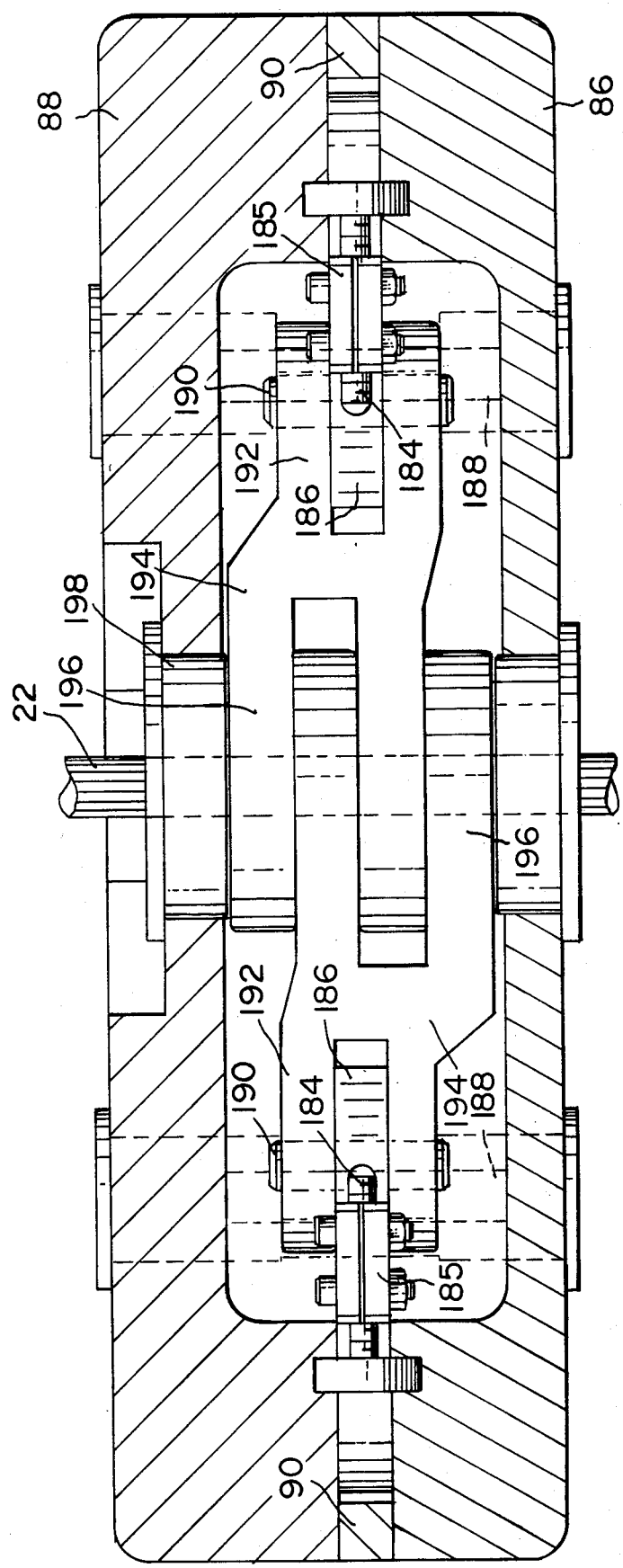

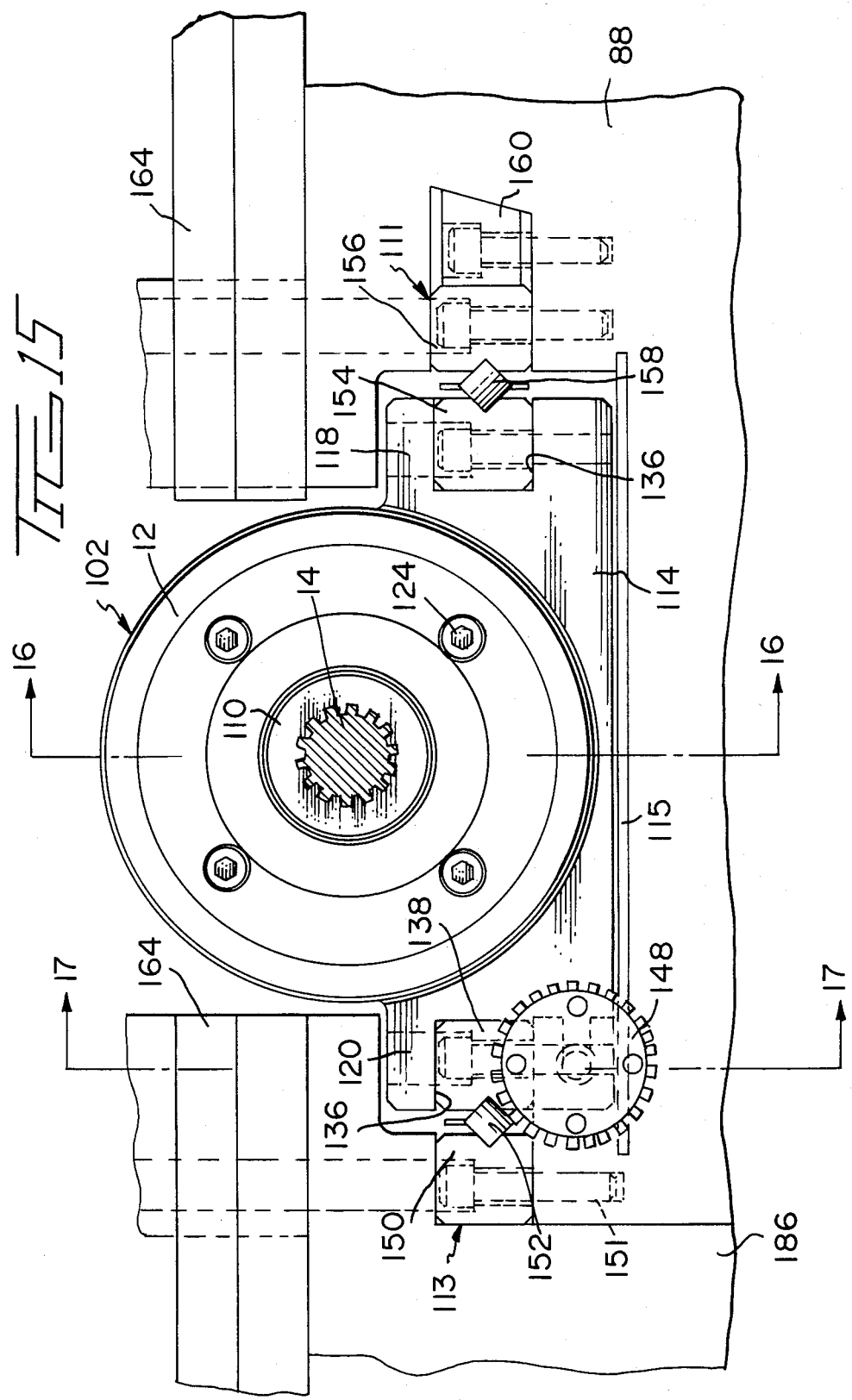

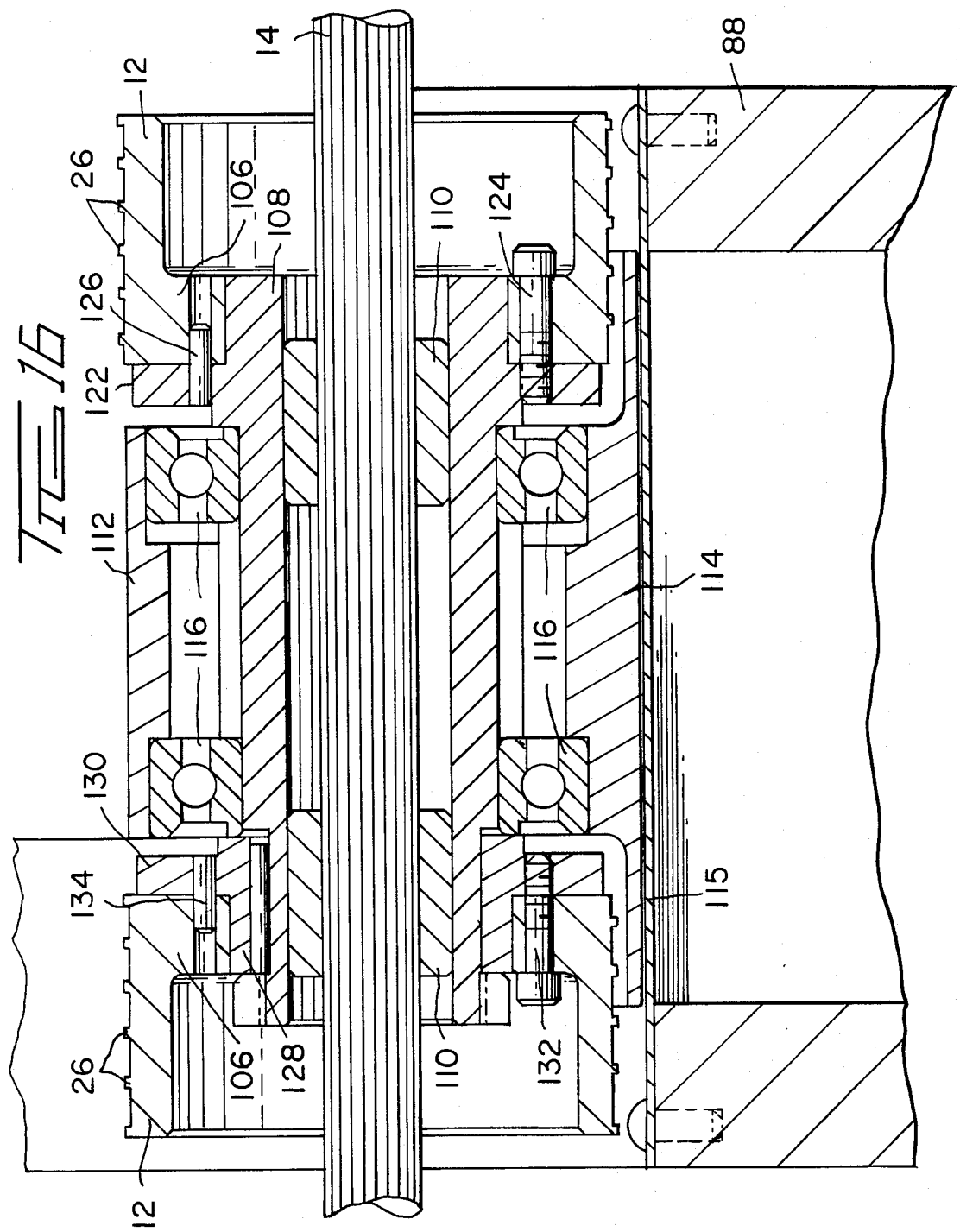

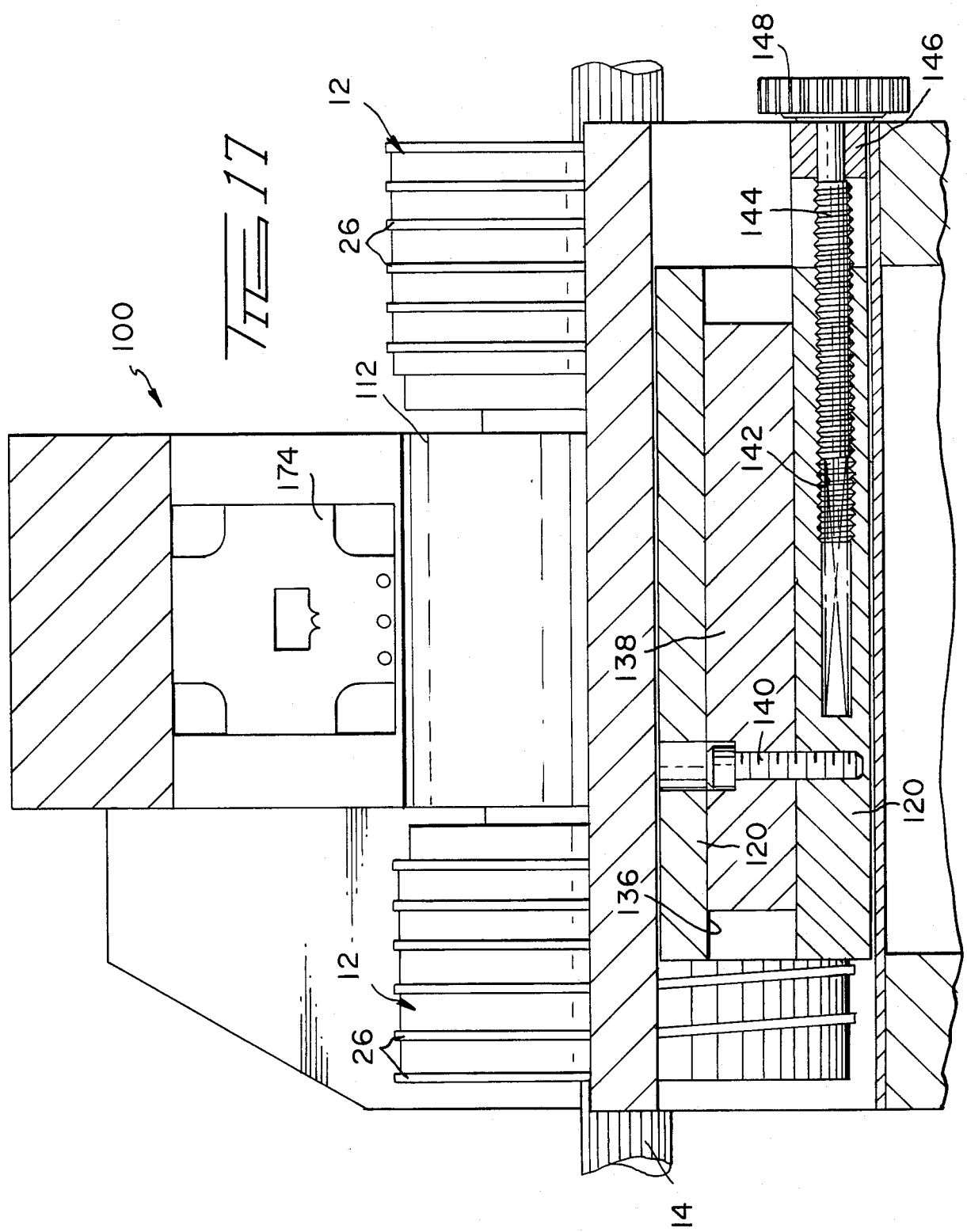

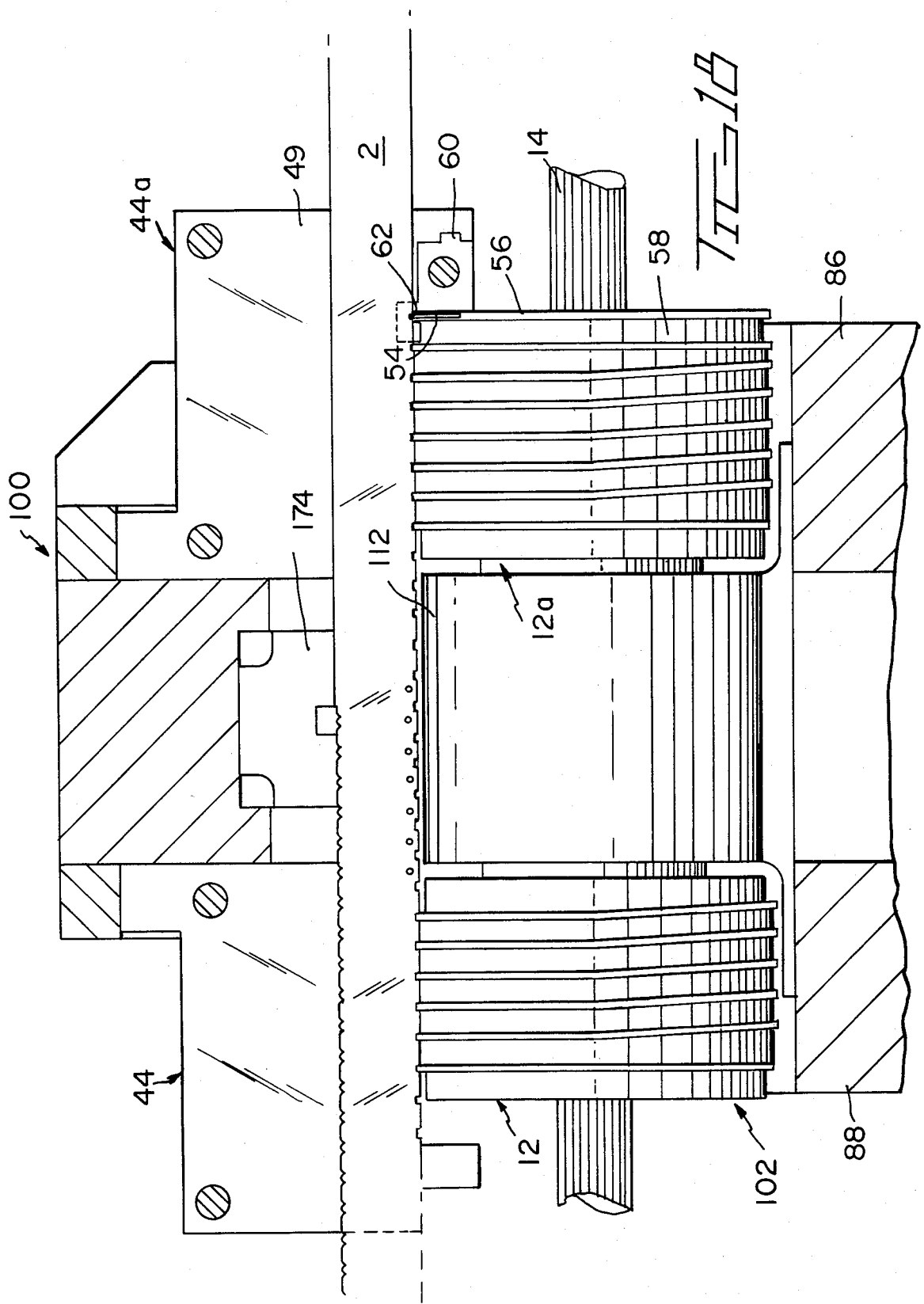

STRIP FEEDING APPARATUS

FIELD OF THE INVENTION

This invention relates to strip feeding apparatus for feeding strip material along a strip feed path. The invention is disclosed as an embodiment which forms part of a stamping and forming machine. However, the feeding apparatus can be used under many circumstances where strip is to be fed intermittently or continuously.

BACKGROUND OF THE INVENTION

A variety of types of strip feeding devices are used for feeding strip material along a feed path such as sprocket feeds, roll feeds and feeding mechanisms having reciprocating clamps of the type commonly referred to as hitch feeds. Sprocket feeds require that spaced apart holes be punched in the strip adjacent to the side edges thereof for reception of sprocket teeth. Roll feed mechanisms are suitable where flat strip is being fed and are particularly useful where feeding takes place continuously. Reciprocating feeding mechanisms, such as hitch feeds as used on metal stamping and forming presses, comprise a reciprocating clamp which advances the strip during each stroke of the clamp.

The feeding mechanisms discussed above all require that when intermittent feeding is being carried out, the feeding mechanism itself must be stopped during non-feeding or dwell intervals and set in motion at the beginning of every feeding interval for the strip. For example, a common hitch feed of the type used on stamping and forming machine comprises reciprocating clamp which is closed onto the strip during the feed stroke, which is opened to unclamp the strip at the end of the feed stroke, and which is then returned to its starting position prior to the succeeding feed stroke. The inertia of the parts of the feeding mechanism must thus be overcome when the feeding mechanism is stopped and the mechanism must be set in motion when the feeding mechanism is started. This feature results in relatively high power requirements for the feed mechanism, far greater than are required for moving the strip and limits the frequency with which strip can be fed intermittently during a given time interval. For example, a punch press operating at a speed of 500 strokes per minute requires that the reciprocating clamp of the feeding mechanism be reciprocated at the same speed.

The present invention is directed to a feeding means for strip material which can be used under a wide variety of circumstances and which overcomes many of the shortcomings of known types of strip feed mechanisms as described above. The invention is further directed to the achievement of a strip feeding apparatus having feeding parts which continuously rotate at a constant speed and which is capable of feeding the strip intermittently, at a constant speed, or at cyclically changing speeds during each feeding cycle. One embodiment of the invention is directed to a feeding apparatus which can be used with metal stamping and forming machines and which will substantially reduce the power requirements for feeding the strip and will permit higher cycle rates of the machine than were heretofore practical.

A preferred embodiment of the invention comprises a strip feeding apparatus for feeding strip along a strip feed path. The strip has at least one straight edge and has notches in the straight edge. The strip feeding apparatus is of the type comprising a strip feeder, an edge guide, and a side guide, the edge guide and the side guide extending at least partially along the feed path and serving to guide the strip along the feed path while the strip is being fed by the feeder. The apparatus is characterized in that the strip feeder comprises a thread support and a feeding thread on the surface of the thread support. The thread support is mounted for rotation on an axis of rotation which extends substantially parallel to the strip feed path and adjacent to the straight edge of a strip on the feed path. The thread is dimensioned to be received in the notches in the strip. A strip retainer is provided for maintaining the straight edge of the strip adjacent to the thread support with the thread extending into at least one notch in the strip. An actuating means is provided for rotating the thread support so that during rotation of the thread support, the thread moves the strip along the strip feed path.

In accordance with a further embodiment, the thread extends for a plurality of turns around the thread support, and each turn of the thread has a strip feeding portion and a strip dwell portion. The strip feeding portion extends substantially helically with respect to the axis of rotation and the strip dwell portion extends along a circular path, the plane defined by the circular path being normal to the plane of the strip. During continuous rotation of the thread support the strip is fed intermittently along the feed path during feeding intervals and the strip dwells during dwell intervals which are between feeding intervals.

In accordance with a further embodiment, the strip feeder comprises at least one pair of thread supports and at least one pair of feeding threads. The pair of thread supports are spaced apart along the axis of rotation and an operating station is provided on the strip feed path between the pair of thread supports for performing an operation on the strip. The operating station may comprise a pair of opposed tool holders which are reciprocable relatively towards and away from each other between open positions, in which the tool holders are remote from each other, and closed positions, in which the tool holders are adjacent to each other, the tool holders having tools thereon for performing an operation on the strip. The thread supports and the tool holders may be adjustable relative to each so that the strip can be precisely positioned in the operating station with respect to the tool holders during dwell intervals.

In accordance with a further embodiment, a strip notching punch and die are provided at a location upstream, relative to the direction of strip feed, from the strip feeder. Punch and die actuating means are provided to move the punch relatively through the die during dwell of the strip thereby to form the notches in the strip. The punch may be provided on a punch support which is mounted for rotation on the axis of rotation of the thread support.

In accordance with a further embodiment, the strip feeder comprises a thread support and a strip guide arranged such that the feeding thread on the thread support engages one edge of strip material in the guide and advances the material during rotation of the thread support.

DESCRIPTION OF THE DRAWINGS

FIG. 2 is an enlarged perspective view showing a feed screw in accordance of the invention having a punch thereon for punching notches in the strip material which is fed.

FIG. 3 is a plan view showing the feeding thread of one of the feeding screws of FIG. 1, this view being the plan development of the cylindrical surface of the feed screw.

FIG. 4 is an enlarged fragmentary perspective view showing a strip guide having a die insert therein.

FIG. 5 is an enlarged side view of a portion of a feeding screw having a notching punch thereon and showing portions of the notching die which is guided in the strip guide.

FIG. 6 is a view taken along the line 6—6 of FIG. 5 and showing the positions of the notching punch immediately prior to punching a notch in strip material which is being fed.

FIG. 7 is a view similar to FIG. 6 showing the positions of the parts after punching of the notch.

FIG. 12 is a perspective view of a machine for performing operations on strip material being feed therethrough, the machine incorporating a feeding apparatus in accordance with the invention.

FIG. 13 is a view taken along the lines 13—13 of FIG. 12.

FIG. 14 is an irregular cross sectional view taken along the lines 14—14 of FIG. 13.

FIG. 15 is an end view of one of the feed assemblies incorporated into the machine of FIG. 12.

FIGS. 16 and 17 are views taken along the lines 16—16 and 17—17 of FIG. 15.

FIG. 18 is a side view of a feeding assembly.

FIGS. 1-11 show the essential elements of a feeding apparatus in accordance with the invention and illustrate the manner of its operation. The parts shown in FIG. 1 are incorporated into a stamping machine of the type shown in FIG. 12. The principles of the invention will first be described with reference to FIGS. 1-11 and the manner in which the invention is incorporated into the machine of FIG. 12 will then be explained.

Figure 1:
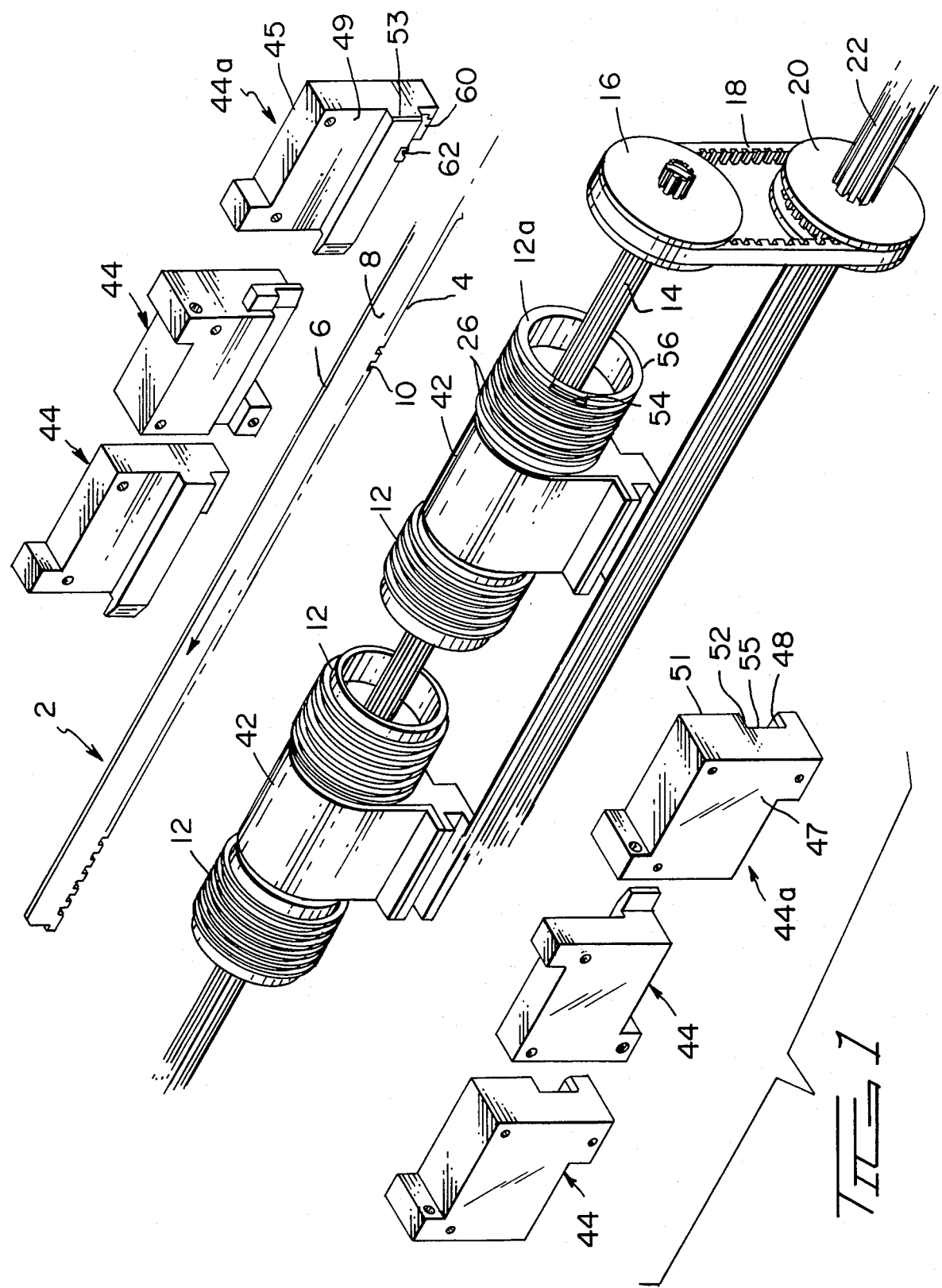
FIG. 1 is a perspective view showing the elements of a feeding apparatus in accordance with the invention.

The strip material 2 may be metal strip, plastic, or of other material. The strip has a lower edge 4 as viewed in FIG. 1 which is straight, an upper edge 6, and side surfaces 8. Notches 10 are provided in the lower edge 4 for cooperation with feeding threads on feed screws 12 which are mounted on a spline shaft 14. The shaft 14 has a pulley 16 on its end and is coupled by a belt 18 to a pulley 20 on a power shaft 22 which is contained in the machine 70 of FIG. 12.

The feed screws 12 are provided in pairs on each side of a support bearing 42 assembly which is described in detail below. The feed screw 12a differs from the remaining feed screws in that it has a punch thereon for forming the notches 10 as will also be described below. The screws 12 have a thread supporting surface 24, FIG. 3, and the feeding thread 26 extends for a plurality of turns on the surface 24 from the end 28 of the feed screw to the end 30.

Each turn of thread 26 has a feeding portion 32 which extends generally helically with respect to the axis of rotation (the axis of shaft 14), and has a dwell portion 34 which extends along a circular path with respect to the axis of rotation. The circular paths of the dwell portions 34 lie in parallel planes which extend normally of the axis of rotation. The dwell portions 34 and the feed portions 32 of each turn of the thread each extend for about 180° around the support surface 24.

The feed portions 32 may be divided into an acceleration portions 36 and deceleration portions 38, the acceleration portions having an increasing lead angle and the deceleration portions having a decreasing lead angle so that when material is being fed, the feeding velocity will be increasing during the initial portion of the feeding portion of each cycle and will decrease during the final portion of the feeding portion. The variations in the lead angles would be slight and are not shown in FIG. 3 for this reason.

At the beginning of the dwell portion 34 of each turn of the thread, a relatively wide thread portion is provided as shown at 40. This wide portion of the thread assists in arresting and controlling the position of the strip at the conclusion of the feeding portion of each cycle as will be explained below with reference to FIGS. 8-11.

Strip guides 44a, 44 are provided on the strip feed path for guiding the strip and maintaining the lower edge of the strip in contact with the feeding threads 26 of the feed screws as shown in FIG. 1. The strip guide 44a, FIGS. 2 and 4 differs from the other strip guides 44 in that the strip guide 44a contains a die which cooperates with the punch, described below, on the feed screw 12a to form the notches 10 in the lower edge 4 of the strip. The guide 44a will now be described with reference to its strip guiding function and the die in the guide 44a is described below. The structural features of the guide 44a which perform the guiding function are substantially the same as the features of the remaining guides 44.

The guide 44a comprises an assembly composed of two parts 45, 47 which have opposed faces 49, 51. The two parts 45, 47 are secured to each other by suitable fasteners as indicated by the fastener openings in FIG. 4. The part 45 has a rib 53 on its face 49 and the part 47 has a complementary channel 55 which receives the rib. The rib is dimensioned such that when the parts are assembled, a slot 43 is formed which guides the strip through the guide block. The lower sidewall 48 of channel 55 serves as a guide for the lower edge 4 of the strip and the upper sidewall 52 of channel 55 guides the upper edge of the strip. The guide is thus positioned such that the lower edge 4 will be maintained substantially against the feed screw 12a.

The strip 2 may be pre-notched prior to its being fed by the feeding apparatus and when the notches are punched in a previous operation, the strip is simply guided along the feed path and the feed threads 26 on the feed screws enter the notches 10 so that during rotation of the feed screws, the strip is advanced along the strip feed path. During each complete rotation of the shaft 14, the strip will be fed for an interval corresponding to the time required for one-half of a complete rotation of the screw and the strip will dwell for the remaining 180° of rotation. During the dwell portion of the cycle, the dwell portions 34 of the feed thread will pass through the notches and they will not impart any movement to the strip. The feeding portions 32, being generally helical, impart motion to the strip in the direction of the arrow in FIG. 1. The end 35 of the feed thread which is adjacent to the end 28 of the feed screw is preferrably tapered so to facilitate its entry into a notch 10 in the strip.

It will be apparent that the two feed screws 12 of each pair must be spaced apart by a distance such that the feeding threads 26 of the feed screws will in fact enter a notch 10 in the strip. It is necessary that the pairs of feed screws 12 be positioned with respect to each other such that the threads will enter the notches.

The feed screw 12a differs from the remaining feed screws 12 in that feed screw 12 has an additional section 58, FIG. 2, on the end thereof towards which the strip 2 is fed. The additional section 58 has a circular flange 56 thereon on which there is provided a radially projecting punch of short angular extent. Punch 54 cooperates with a die 62 which is formed in a die insert 60 which is mounted in the section 45 of the guide block 44a, see FIG. 4. The die insert has a channel 64 in its underside which receives the additional section 58 of the feed screw and the shearing edges of the die 62 are formed in this channel as shown in FIG. 4. The punch 54 is located on the flange 56 at a position which is in alignment with the dwell portions 34 of the feed thread 32 so that the strip will be stationary when the punch moves through the die 62 and forms a notch 10 in the edge 4 of the strip. The punch 54 has a relatively short angular extent along the flange 56 and will have moved beyond the strip when the next feeding portion of the cycle commences.

When the punch moves through the die 62, a small slug of material is removed from the strip to produce the notch 10. It is desirable to provide a rake 66 on the leading end of the punch to facilitate removal of this small slug of scrap. Additionally, the die insert 60 has a recess adjacent to the die into which this slug is propelled by the leading end of the punch as indicated in FIG. 7. It may be desirable to provide brushes 68 on each side of the feed screw 12a to remove any pieces of scrap which may adher to the thread or to the support surface of the feed screw.

Figure 8:
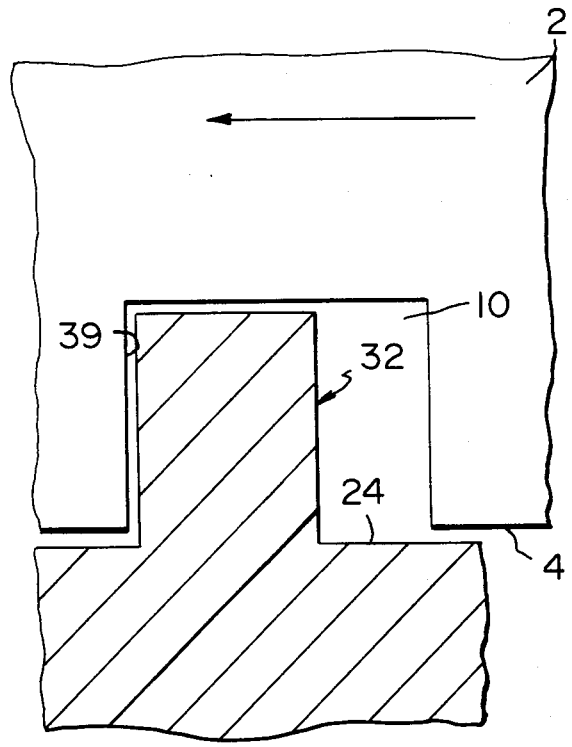
FIG. 8 is an enlarged fragmentary side view showing the relationship of the feeding thread to a notch in the strip being fed, this view showing the positions of the parts during feeding.
Figure 9:
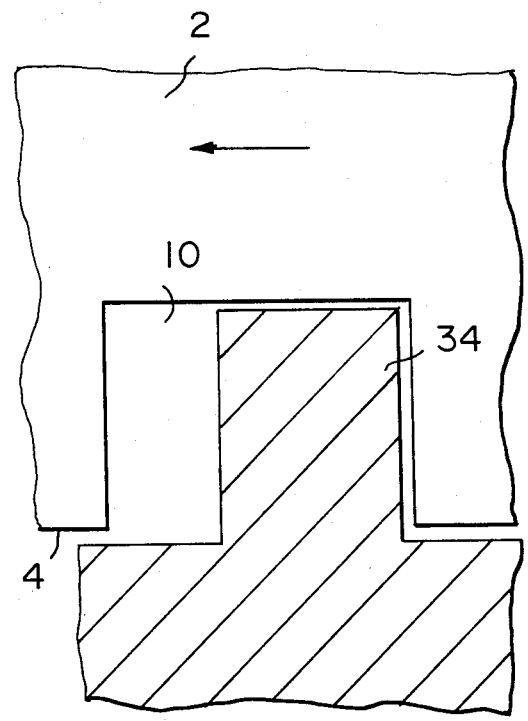
FIGS. 9 and 10 are views which illustrate the manner in which the strip is brought to rest at the end of the feeding portion of a cycle of the apparatus.

FIG. 8 shows the condition which exists during feeding of the strip, that is, while a feeding portion 32 moves through a notch 10. The width of the feeding portion 38 is considerably less than the width of the notch and the left-hand side of the thread will bear against the left-hand edge 39 of the notch thereby to push the strip in the direction of the arrow of FIG. 8. FIG. 9 shows the condition which would exist if the dwell portion 34 of each turn of the thread were uniformly of the same width and of a width substantially less than the width of the notch 9. As the dwell portion would move into the notch, the dwell portion would not impart motion to the strip but the strip, because of the inertia, would move a slight additional distance as indicated by the arrow in FIG. 9.

Figure 10:
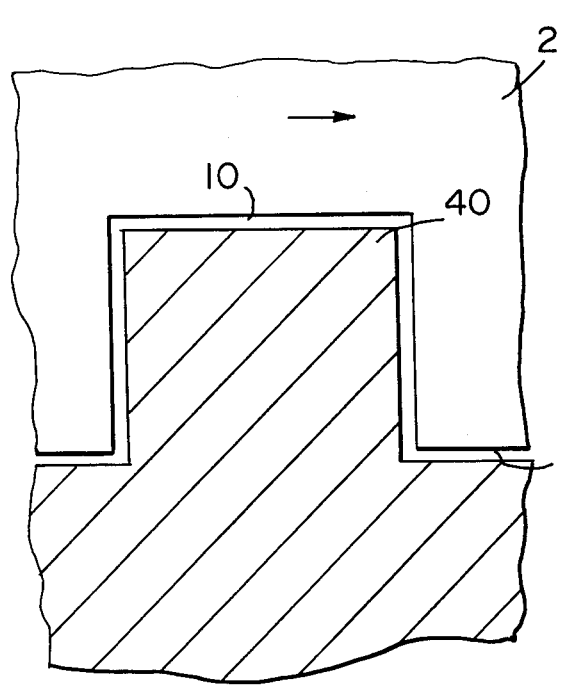
Figure 11:
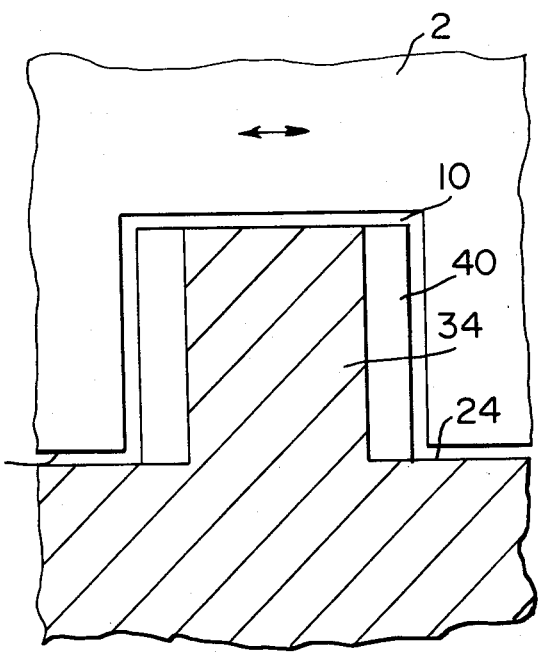
FIG. 11 is a view similar to FIG. 8 showing the relationship of the feeding thread to the notch in the strip during the dwell portion of a feeding cycle.

As explained previously, the portion of each turn of the thread at the beginning of each dwell section is relatively wide as shown at 40 and as this wide portion 40 moves into the notch 10, it imparts a slight retrograde motion to a strip 2 so that any overtravel resulting from inertia is cancelled and the strip is located with precision by the wide portion of the thread 40, see FIG. 10. The portion 40 of each turn serves as an arresting portion in that it arrests movement of the strip. As shown in FIG. 11, the remaining dwell portion 34 of each turn of the thread is more narrow than the feed portion 38 and is located in the center of the notch after the wide portion 40 moves out of the notch so that the strip can now be moved for a very slight distance in either direction relative to the dwell portion 34 of the thread, as indicated by the double-ended arrow. This feature is advantageous in that the operating assemblies 100 described below will frequently have aligning and locating pins which move into suitable pilot holes in the strip precisely to locate the strip in the operating assembly. It is desirable to approximately locate the strip, however, so that the aligning pins can enter the aligning holes in the strip.

A salient advantage of a strip feeding apparatus in accordance with the invention is that the moving parts of the feeding apparatus comprise essentially one or more feed screws which are continuously rotated at a constant speed. Only the strip is fed intermittently and brought to a halt between feeding steps. The fact that the feed mechanism comprises only balanced rotating parts results in a substantial reduction in vibration and wear as compared, for example, to a conventional hitch feed as used on a stamping press. Good control of the strip is maintained by virtue of the fact that the feeding thread is received in the notches in the strip at all times and the strip is therefore held captive.

Depending upon the requirements, a plurality of feeding screws 12 can be located on the feed path at spaced-apart intervals as in the embodiment shown in FIG. 1 so that motion is imparted to the strip at several locations along the feed path. This arrangement will eliminate any tendency towards buckling of the strip if it is relatively flimsy.

The invention can be used under a wide variety of circumstances. Under some circumstances, perhaps only a single feed screw will be required. Associated pairs of feed screws as shown in FIG. 1 and as described below can be used where the strip is being fed past an operation station (a marking station or a punch and die), an arrangement which precisely positions the strip during non-feeding intervals with respect to the tooling or other devices in the operating station.

The principles of the invention can be employed to produce continuous feed, intermittent feed as described above, or a varying velocity feed of strip along a feed path. A cyclically varying feed velocity can be achieved by varying the lead angle of the thread. Where an intermittent feed is required, the relative angles of the feeding interval and the dwell interval can be precisely predetermined by providing appropriate lengths of dwell portions and feed portions in each turn of the thread, in other words, by varying the angular extent of the two portions of the thread.

FIGS. 12–18 show a machine for performing multiple operations of strip material having strip feeders therein in accordance with the invention. The machine 70 has a bed 72 on which there are mounted a plurality of identical operating units 74. The strip material is supplied from a reel 76 and is fed through each of the operating units. The processed strip 2' is then taken up on a reel 78. The processed strip may, for example, comprise a strip of formed articles such as electrical terminals.

Each operating unit 74 comprises a housing assembly 80, an operating assembly 100, a feed assembly 102, and an actuator assembly 104. The housing assembly of each unit has a top surface 82 and a base 84 which is adjustably mounted on the bed 72 by dovetail mounting means in the base 84. The housing comprises a pair of housing castings 86, 88 (see FIG. 14) between which there is positioned a main spacer 90 and smaller spacers 92, 94 on opposite sides of the center line of the machine. The upper ends 96 of the spacer 90 are spaced from the center spacers 92, 94 so that gaps 98 are provided through which actuator levers 186 extend. The opposed surfaces of the castings 86, 88 are recessed as generally shown in FIG. 14 for the accomodation of the elements of the actuator assemblies 104 and the upper ends of the castings adjacent to the top surface 82 are provided with recesses in which the feeding assembly 102 is mounted as will be described below.

Referring now to FIGS. 15-18, the feed assembly 102 comprises the previously identified feed screws 12, the supporting structure for supporting these screws on the shaft 14, and mounting and support bearings 111, 113 for supporting the feed assembly on the center line of the machine and beneath the feed path of the strip material. The feed screws 12 have inwardly directed flanges 106 by means of which they are mounted on a rotatable cylindrical support 108 that is coaxially mounted on the feed shaft 14. The feed screw 12 on the right in FIG. 16 is mounted against a circumferential flange 122 on the cylindrical support 108 and is precisely positioned on the support by means of an aligning pin 126 which extends through aligned openings in the flanges 106, 122. Fasteners 124 serve to securely hold the feed screw on the flange. The feed screw 12 on the left in FIG. 16 is supported on a cylindrical mounting sleeve 128 which in turn is mounted on a reduced diameter section of the cylindrical support 108. The mounting sleeve 128 has a flange 130 against which the left-hand feed screw is mounted by means of aligning pin 134 and fasteners 132.

The cylindrical support 108 has an axial splined bore extending therethrough and is secured to the shaft 14 by means of splined coupling sleeves 110 which are also bored and internally splined. It will be apparent then that the entire assembly can be moved axially with respect to the shaft 14 and that the cyclindrical support 108 and the feed screws 12 will rotate with the shaft 14.

The cylindrical support 108 is supported in a bearing housing 112 having a base portion 114. Suitable ball bearings and bearing races 116 are provided between the interior of the bearing housing 112 and the surface of the cylindrical support 108 to permit rotation of the support within the static housing 112.

The entire assembly 102 is supported between the spacers 92, 94 by means of linear bearing assemblies 111, 113, see FIGS. 13 and 15. A cover 115 may be provided on the upper ends of castings 86, 88 to seal the feed unit from the interior of the housing assembly.

The base 114 of the bearing housing 112 has laterally directed extensions 118, 120, see FIG. 15, which have elongated recesses 136 therein extending parallel to the feed path of the strip and parallel to the axis of rotation of the feed screws. The linear bearing assembly 113 comprises a movable bearing race 138 which is slidably contained in the recess 136 on the left in FIG. 15. The bearing race 138 in turn is secured by a fastener 140 to the lower portion of the extensions 120, see FIG. 17, and a threaded hole 142 extends into the lower portion of the extension 120 from the end of the feed assembly. A captive adjusting screw 144 is threaded into the hole 142 and has an adjusting knob 148 on its end. It will be apparent from FIG. 17 that turning of the head 148 on screw 144 will cause linear movement of the entire feed assembly. The adjusting screw is supported in a sleeve 146 which in turn is secured to the casting 86 so that movement of the screw is prevented and the extension 120 must therefore be moved relative to the screw.

The bearing race 138 extends parallel to a fixed bearing race 150 and suitable roller bearings 152 are positioned between the fixed bearings race 150 and the movable bearing race 138. The bearing race 150 is secured in a recess in the casting 86 by a fastener 151 as shown in FIG. 15.

The linear bearing assembly 111 which is shown on the right in FIG. 15 is substantially similar to the bearing assembly 113 excepting that no adjusting feature is provided in the right-hand bearing assembly. Adjustment of the race 138 in the left-hand assembly 113 will result in movement of the entire feed assembly. The bearing assembly 111 thus comprises a movable race 154 which is secured to the extension 118 by a fastener as shown, a fixed bearing race 156, and the roller bearing members 158. A wedge 160 is provided against the fixed bearing race member 156 so that the two linear bearings 111, 113 can be moved inwardly towards each other so that they will support the feed assembly 102.

The operating or tooling assembly 100, FIG. 13, comprises a guide block 162 which is supported by spacers 164 above the upper surface 82 of the housing assembly and centrally with respect to the strip feed path and the axis of the feed assembly 102. The guide block 162 is symmetrical with respect to the vertical center line of the machine so that a description of the right-hand side in FIG. 13 will suffice for the entire tooling assembly and for the actuator assembly 104.

Guide block 162 has a cylindrical extension 166 which projects laterally of the feed path and a bore 168 is provided in this extension and in the central portion of the guide block. The bores extend to the center 170 of the guide block and to the feed path of the strip. Guide slots 43 are provided which extend along the feed path and serve as strip guides as explained above with reference to FIG. 2.

A slide 172 is contained in the bore 168 and a tool holder 174 is carried by the face of the slide so that the tool holder is moved to the center 170 of the guide block during each inward stroke of the slide 172. The tool holder 174 may have any suitable forming or other tooling thereon to perform an operation on the strip. It is noteworthy that with the arrangement shown, either a punch or a die may be provided on either of the opposed tool holders 174. For example, it may be desirable to provide a punch on the right-hand tool holder in one of the operating units 74 and to provide a punch on the left-hand tool holder 174 in an adjacent operating unit.

A rod 176 extends from the slide 172 outwardly beyond the end of the cylindrical extension 166 and this rod has a spherical end which is received in spherical recess of a coupling 178. The slide 172 is normally biased outwardly and away from the feed path of the strip by a spring 180 which surrounds the extension 166 and which bears against a spring retainer 182 on the rod 176.

During each operating cycle, the slide 172 and the tool holders 174 are moved inwardly to the strip feed path and are returned to the positions as shown in FIG. 13 by the springs 180. The actuating assembly 104 for moving the slides 172 inwardly comprises actuator levers 186 having upper ends 185 which extend through the gaps 98 in the housing. Force transmitting adjusting screws 184 are threaded through these upper ends 185 and bear against the coupling member 178. The levers 186 are pivoted at the lower ends at 188 and are pivoted intermediate their ends at 190 to connecting rods 194.

The connecting rods 194 have bifurcated outer ends 192 which extend over the surfaces of the lever 186 and have bifurcated inner ends 196 which have eccentric couplings 198 to the main power shaft 22.

The main power shaft 22 is continuously rotated by a motor 200, FIG. 12, and during each revolution of the main power shaft the tool holders are moved inwardly towards each other and then return to the outer positions. During each revolution of the shaft 22, the feed shaft 14 is rotated through a single revolution by the belt coupling 16, 18, 20 shown in FIG. 1. The strip is fed in synchronism with the movement of the tool holders so that the strip will be stationary when the tool holders arrive at the inner positions and engage the strip.

The invention is herein disclosed as an embodiment in which the strip is fed with the plane of the strip extending vertically, however, the invention is also useful if it is desired to feed the strip in a horizontal plane, for example, where a feed is required for feeding strip to a conventional stamping and forming press having tooling which reciprocates vertically.

The feed has been disclosed in conjunction with the machine of FIG. 12 as an illustration of one possible use of the feed mechanism. The strip feed offers particular advantages when used with a machine of the type shown in FIG. 12 for the reason that when the strip passes through the operating units 74 of the machine, it may be slightly lengthened as a result of the operations carried out on the strip. Such slight lengthening is a troublesome phenomenon in the stamping art and is overcome only with great difficulty in conventional stamping presses.

The machine of FIG. 12 has a separate operating unit for each die station and each unit contains its own feed mechanism. If the strip 2 should be slightly lengthened as a result of the operations performed on it, the feeding units can be adjusted relative to each other by slight amounts to compensate for this lengthening of the strip. Since each feeding unit 74 contains a strip feed assembly, the elongation of the strip and the adjustment of the feeding units along the feed path does not cause problems of the type encountered with conventional stamping and forming machines.

We claim:

1. Strip feeding apparatus for feeding strip along a strip feed path, the strip having at least one straight edge and having notches in the straight edge at spaced intervals, the strip feeding apparatus being of the type comprising a strip feeder, an edge guide, and a side guide, the edge guide and the side guide extending at least partially along the feed path and serving to guide the strip along the feed path while the strip is being fed by the feeder, the apparatus being characterized in that:
    the strip feeder comprises a thread support and a feeding thread on the surface of the thread support, the thread support being mounted for rotation on an axis of rotation which extends substantially parallel to the strip feed path and adjacent to the straight edge of a strip on the feed path, the thread being dimensioned to be received in the notches in the strip,
    a strip retainer for maintaining the straight edge of the strip adjacent to the thread support with the thread extending into at least one notch in the strip, and
    an actuating means for rotating the thread support whereby,
during rotation of the thread support, the thread moves the strip along the strip feed path.

2. Strip feeding apparatus as set forth in claim 1 characterized in that the thread extends for at least one complete turn around the thread support.

3. Strip-feeding apparatus as set forth in claim 1 characterized in that the thread extends for a plurality of turns around the thread support, each turn of the thread having a strip feeding portion and a strip dwell portion, the strip feeding portion extending substantially helically with respect to the axis of rotation and the strip dwell portion extending along a circular path; the plane defined by the circular path being normal to the plane of the strip whereby during continuous rotation of the thread support the strip is fed intermittently along the feed path during feeding intervals and the strip dwells during dwell intervals which are between feeding intervals.

4. Strip feeding apparatus as set forth in claim 3 characterized in that the strip feeder comprises at least one pair of thread supports and at least one pair of feeding threads, the pair of thread supports being spaced apart along the axis of rotation, and an operating station on the strip feed path between the pair of thread supports for performing an operation on the strip.

5. Strip feeding apparatus as set forth in claim 4 characterized in that the operating station comprises a pair of opposed tool holders, at least one of which is reciprocable towards and away from the other between open positions, in which the tool holders are remote from each other, and closed positions, in which the tool holders are adjacent to each other, the tool holders having tools thereon for performing an operation on the strip.

6. Strip feeding apparatus as set forth in claim 5 characterized in that the thread supports and the tool holders are adjustable relative to each other whereby the strip can be precisely positioned in the operating stations with respect to the tool holders during dwell intervals.

7. Strip feeding apparatus as set forth in claim 6 including a feed shaft which is co-axial with respect to the axis of rotation, and a sleeve wherein the thread supports are disposed on said sleeve, whereby the sleeve is coupled to the feed shaft for rotation therewith, as well as being adjustably movable along the axis of the feed shaft, thereby providing adjustment of the thread supports relative to the tool holders.

8. Strip feeding apparatus as set forth in claim 7 characterized in that the tool holders are actuated and moved towards and away from each other by the actuating means.

9. Strip feeding means as set forth in claim 8 characterized in that the actuating means comprises a power shaft which extends parallel to the feed shaft, the feed shaft being coupled to the power shaft.

10. Strip feeding means as set forth in claim 4 characterized in that the strip feeder comprises a plurality of pairs of thread supports and a plurality of operating stations.

11. Strip feeding means as set forth in claim 9 characterized in that a plurality of pairs of thread supports and a plurality of pairs of opposed tool holders.

12. Strip feeding apparatus as set forth in claim 3 characterized in that the strip feeding portion of each turn of the feeding thread comprises an acceleration portion, and a deceleration portion, the acceleration portion and the deceleration portion of each turn having varying lead angles which impart acceleration and deceleration respectively, to the strip at beginning and end of each feeding intervals.

13. Strip feeding apparatus as set forth in claim 3 characterized in that a strip notching punch and die are disposed at a location upstream, relative to the direction of strip feed, from the strip feeder, the punch and die being on opposite sides of the strip adjacent to the straight edge of the strip, and punch and die actuating means being provided to move the punch and die relatively towards each other during dwell of the strip thereby to form the notches in the strip.

14. Strip feeding apparatus as set forth in claim 13 characterized in that the punch is disposed on a punch support which is mounted for rotation on the axis of rotation of the thread support.

15. Strip feeding apparatus as set forth in claim 12 characterized in that the feed path extends horizontally, the strip being in a vertical plane.

16. Strip feeding apparatus for feeding strip material along a strip feed path, the apparatus being of the type comprising a strip feeder, which imparts feeding motion to the strip, and a strip guide which guides the strip along the feed path, the strip having feeding edge portions which are engaged by the strip feeder, the strip feeding apparatus being characterized in that:

the strip feeder comprises a thread support and a feeding thread on the surface of the thread support, the thread support being mounted for rotation on an axis of rotation which extends substantially parallel to, and adjacent to, the strip feed path so that the thread will engage the feeding edge portions of a strip on the strip feed path, the feeding thread extends for a plurality of turns around the thread support, each turn of the thread having a strip feeding portion and a strip dwell portion, the strip feeding portion extending substantially helically with respect to the axis of rotation and the strip dwell portion extending along a circular path, the plane defined by the circular path being normal to the plane of the strip, and actuating means for rotating the thread support around the axis of rotation whereby, during rotation of the thread support the strip is fed intermittently along the feed path during feeding intervals and the strip dwells between feeding intervals.

17. Strip feeding apparatus as set forth in claim 16 characterized in that the feeding edge portions extend transversely of the length of the strip and are provided at uniformly spaced intervals.

18. Strip feeding apparatus as set forth in claim 17 characterized in that the strip has at least one straight edge and has notches in the straight edge at uniformly spaced intervals, the feeding thread being received in at least one notch during feeding of the strip, edge portions of the notches being the feeding edge portions.

19. Strip feeding apparatus as set forth in claim 18 characterized in that the feeding thread has a feed arresting portion at the beginning of the strip dwell portion of each turn, the feed arresting portions being dimensioned to substantially fully occupy the notches in the strip and thereby arrest movement of the strip.

20. Strip feeding apparatus as set forth in claim 19 characterized in that the feeding portion and the dwell portion of each turn of the thread, other than the arresting portion, are dimensioned to be freely received in the notches in the strip and permit limited movement of the strip relative to the thread.

21. The method of feeding strip material, which has at least one straight edge, substantially endless source of strip material along a strip feed path, the method comprising the steps of:

notching the straight edge of the strip at spaced apart intervals, engaging the one straight edge of the strip with a feed screw which is proximate to the strip feed path, which has a feed thread that is dimensioned to be received in the notches, and which is rotatable on an axis which extends parallel to the strip feed path, and rotating the feed screw whereby the strip is parallel and advanced along the feed path.

22. A method of feeding strip material as set forth in claim 21 characterized in that of the notching of the strip is carried out at a notching station which is located between the source of strip material and the feed screw.

* * * * *

UNITED STATES PATENT OFFICE
CERTIFICATE OF CORRECTION

Patent No. 4,489,871               Dated December 25, 1984

Inventor(s) Johannes C. W. Bakermans & Dimitry G. Grabbe

It is certified that error appears in the above-identified patent and that said Letters Patent are hereby corrected as shown below:

Column 12, line 27, the words "from a" should be inserted after the word --edge--.

Signed and Sealed this

Twenty-third Day of July 1985

[SEAL]

Attest:

DONALD J. QUIGG

Attesting Officer           Acting Commissioner of Patents and Trademarks